Patented Jan. 9, 1923.

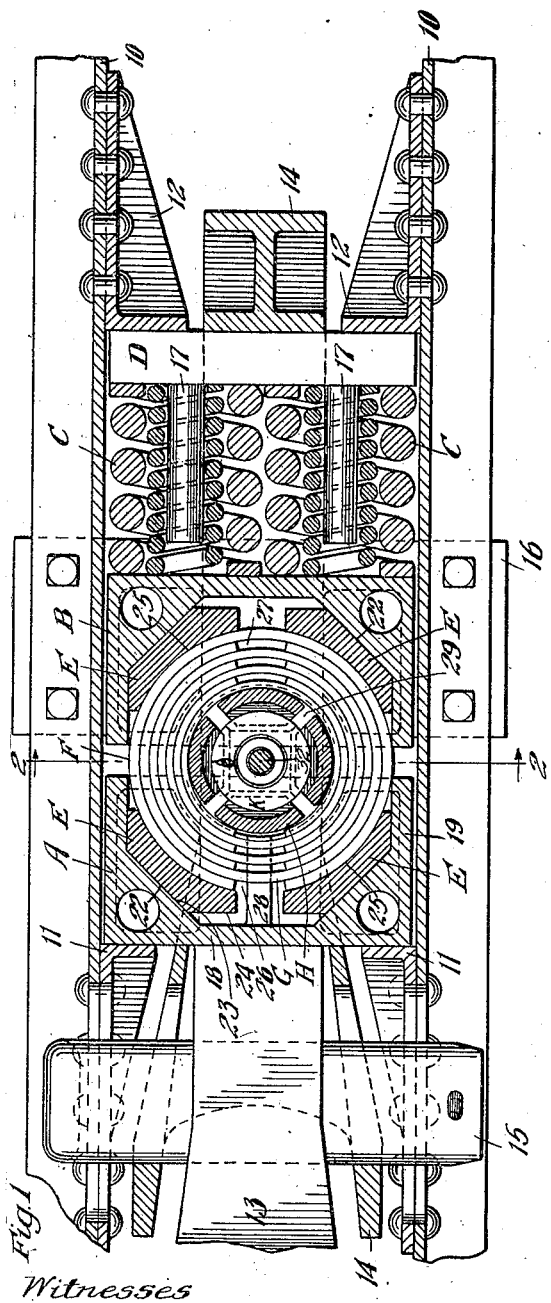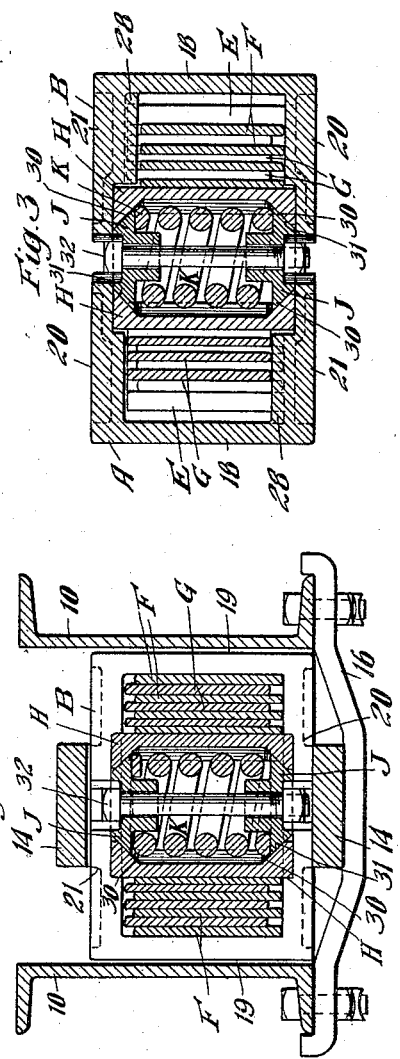

1,441,295

UNITED STATES PATENT OFFICE.

JOHN F. O'CONNOR, OF CHICAGO, ILLINOIS, ASSIGNOR TO WILLIAM H. MINER, OF CHAZY, NEW YORK.

FRICTION SHOCK-ABSORBING MECHANISM.

Application filed February 23, 1921. Serial No. 447,150.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a friction shock absorbing mechanism especially adapted for railway draft riggings, having a friction spring unit of unusually compact form and high capacity.

Another object of the invention is to provide a friction spring shock absorbing unit employing circularly arranged series of intercalated friction spring plates wherein is utilized certain space for productive work which space has heretofore not been utilized.

A specific object of the invention is to provide simple and economical means for preventing disarrangement of a series of intercalated circular friction spring plates.

Other objects of the invention will more clearly appear from the description hereinafter following.

In the drawing forming a part of this specification, Figure 1 is a longitudinal, horizontal, sectional view of a portion of a railway draft rigging showing my improvements in connection therewith. Figure 2 is a vertical, transverse section corresponding substantially to the line 2—2 of Figure 1. And Figure 3 is a longitudinal, vertical, sectional view taken centrally of the spring friction unit proper.

In said drawing, 10—10 denote channel draft sills of a railway car to the inner faces of which are secured front stop lugs 11 and rear stop lugs 12. A portion of a drawbar is indicated at 13, the same being operatively associated with the shock absorbing mechanism proper by means of a hooded cast yoke 14 and coupler key 15. The yoke and parts therein are adapted to be supported in operative position by a detachable saddle plate 16.

In carrying out my invention, as shown, I employ, broadly, a heavy front follower A; a central heavy follower B; twin arranged springs C—C; a rear follower D; four friction blocks E—E; two sets of intercalated circular friction spring plates F and G; a series of friction shoes H—H; a pair of spring followers J—J and a coil spring K.

The twin springs C are of the usual construction, each preferably consisting of an outer heavy coil and an inner nested lighter coil. Each of said springs is seated over an elongated post or stud 17 carried by the rear follower D, said post 17 being of such length as to permit the full compression of the twin springs without allowing the latter to become over-compressed or set. In this connection, it may be observed that I preferably allow the twin springs to take up approximately $1\frac{1}{4}''$ of the stroke where the allowed stroke is $2\frac{1}{2}''$, the remainder being taken up in the friction spring unit, as hereinafter described.

The heavy followers A and B are of like construction but one is upside down with respect to the other and faced in the opposite direction. Each of said heavy followers is of box-like form having a transverse end wall 18, side walls 19—19 and horizontal walls 20 and 21. On their inner sides, each follower A and B is provided with a pair of opposed wedge faces 22—22 in the corners, thereby making the interior of the two followers considered collectively, of substantially octagonal form as seen in Figure 1. The four friction blocks E are of like construction and each is formed on its outer side with a friction wedge face 23 adapted to slide upon and cooperate with a corresponding friction wedge face 22 of one of the followers. At each end, each block E is formed with a flat face as indicated at 24—24 by which the movement of the blocks is adapted to be limited with respect to the followers A and B, as will be evident from an inspection of Figure 1. On its inner side, each block E is formed with an arcuate friction face 25 adapted to conform to the periphery of the outermost friction plate F.

The series of intercalated friction spring plates comprises two sets, as hereinbefore mentioned. The set of plates F is alternated with a set of plates G as shown and preferably the thickness of the plates F and G gradually diminishes from the exterior to the interior of the series in order to avoid excessive stresses in the plates in accordance with their shorter diameters. Each of the plates F and G extends through an arc somewhat less than 360° so that, normally, gaps are left between the ends of each plate. In the case of the set F, said gaps, as indicated at 26, are brought nearest the coupler whereas the gaps 27 of the alternate set are faced rearwardly or farthest from the coupler and as is well known, it is desirable that such circular friction spring plates be prevented from having all of their gaps brought into alinement or with the gap of one partially coinciding with the gap of a next adjacent plate since the ends would then be liable to engage each other and prevent proper circumferential contraction of the plates during compression. To accomplish this desired result, each heavy follower A and B is provided with a longitudinally extending rib as indicated at 28 on the inner side of one wall, as for instance the wall 21. The space vertically between said rib and the opposite wall 20 of the follower corresponds substantially to the vertical dimension or width of the spring plates. By reversing the position of the followers A and B, as best indicated in Figure 3, one rib 28—as for instance, on the front follower A, comes at the bottom and the other rib 28 at the top and hence the set of plates F will assume a lower position than the set G. It is obvious that the ends of the plates of set F will come opposite the rib 28 of the front follower A and hence be prevented from shifting circumferentially a greater distance than the difference between the width of the gaps 26 and the width of the rib 28. The same will be true of the other set G of plates, the ends of which will come opposite the upper rib 28 of the follower B. The arrangement is exceedingly simple and accomplishes the desired result effectively.

Heretofore, it has not been customary to utilize the central space of the series of circular friction plates but in my construction I effectively utilize this space to add capacity to the device. Preferably, four friction shoes H are employed each of arcuate form on its outer side and conforming substantially to the curvature of the innermost plate G. The shoes H are normally spaced as indicated at 29 in Figure 1 so that, as a series, they may be contracted in accordance with the contraction of the plates F and G and friction generated between the outer surfaces of said shoes H and the innermost plate F.

The shoes H are formed on their interiors with upper and lower opposed wedge faces 30—30, as shown in Figures 2 and 3, which faces are adapted to cooperate with corresponding wedge faces 31—31 on the spring followers J—J. It will thus be seen that, upon the contraction of the series of shoes H, the followers J—J will be forced relatively toward each other in a vertical direction, thereby compressing the coil spring K, which is interposed therebetween, it being understood that the axis of the coil spring K extends vertically or substantially coincident with the axis of the series of plates F and G. Preferably I employ a retainer bolt 32 extended through the follower J—J.

In operation, in addition to the capacity obtained by the twin springs C—C, I obtain frictional capacity by reason of the movement of the blocks E on the followers A and B; friction between the outermost plate F and the blocks E; friction between the plates F and G as the latter are contracted; friction between the innermost plate G and shoes H; friction between the shoes H and followers J, and finally the capacity of the spring K.

The friction unit proper utilizes all possible space; it is unusually compact; and of very high capacity.

I have herein shown and described what I now consider the preferred manner of carrying out the invention but the same is merely illustrative and I contemplate all changes and modifications that come within the scope of the claims appended hereto.

I claim:

1. In a friction shock absorbing mechanism, the combination with a pair of followers relatively movable; of a series of intercalated spring friction circular plates confined within the followers, said plates being circumferentially contractible and expansible; means carried by the followers for contracting said plates upon relative movement of the followers, and additional spring and friction devices located within and centrally of the series of circular plates and adapted to be operated by the latter upon contraction.

2. In a friction shock absorbing mechanism, the combination with a pair of relatively movable followers including wedging means; of a series of intercalated spring friction circular plates confined within the followers, said plates being circumferentially contractible and expansible; and additional spring and friction devices located within and centrally of the series of circular plates and adapted to be operated by the latter upon contraction, said devices comprising a contractible set of circularly arranged friction shoes, a spring, and spring followers, said spring followers and shoes having cooperating wedge faces.

3. In a friction shock absorbing mechanism, the combination with a pair of followers relatively movable; of a series of intercalated spring friction circular plates confined within the followers, said plates being circumferentially contractible and expansible; means carried by the followers for contracting said plates upon relative movement of the followers, and additional spring and friction devices located within and centrally of the series of circular plates and adapted to be operated by the latter upon contraction, said devices including a circumferentially contractible series of friction shoes and spring means therewithin.

4. In a friction shock absorbing mechanism, the combination with a pair of relatively movable followers including wedging means; of a series of intercalated spring friction circular plates disposed within said followers, said plates being circumferentially contractible and expansible; a series of circumferentially contractible friction shoes disposed centrally of said circular plates; a coil spring disposed within said shoes and having its axis coinciding substantially with the axis of the circular plates; and means interposed between the shoes and the coil spring arranged to compress the latter upon contraction of the spring friction plates.

5. In a friction shock absorbing mechanism, the combination with a pair of relatively movable followers, each follower having a longitudinally extending rib on the inner side thereof and the followers oppositely arranged; of a series of intercalated spring friction circular plates disposed within said followers, each of said spring plates having a gap therein between its free edges, the gaps of alternate plates being disposed at one side and those of the other plates opposite thereto, the ends of one set of plates being disposed opposite the rib of one follower and the ends of the other set of plates opposite the ribs of the other follower to thereby prevent disarrangement of the plates and means associated with said followers for contracting said series of plates.

6. In a friction shock absorbing mechanism, the combination with a pair of hollow followers relatively movable toward and from each other, each follower having a fixed rib extending parallel to the line of relative movement, the rib being located on the inner side of one wall of the follower; of a series of intercalated spring friction circular plates each of a width corresponding substantially to the distance between the rib and opposed wall of the follower, each spring plate having a gap therein between its free edges and the gaps of alternate plates being disposed at one side and those of the other plates diametrically opposite whereby the rib of one follower is adapted to extend within one set of said gaps and the rib of the other follower in the other set of gaps and means associated with said followers for contracting said series of plates.

7. In a friction shock absorbing mechanism, the combination with a pair of followers relatively movable toward and from each other, said followers having opposed wedge faces on the interiors thereof; of a plurality of friction blocks having outer wedge faces frictionally cooperable with the wedge faces of the followers, said blocks having inner curved friction faces; a series of intercalated spring friction circular plates mounted between said blocks and the outermost one of which engages said curved faces of the blocks; and additional spring and friction devices located within and centrally of the series of circular plates and adapted to be operated upon contraction of the circular plates.

8. In a friction shock absorbing mechanism, the combination with a pair of followers relatively movable toward and from each other, said followers being of hollow formation and provided on the interior thereof with opposed wedge faces and a longitudinally extending rib; of a series of friction blocks having outer wedge faces cooperable with the follower wedge faces, said friction blocks having inner curved friction surfaces; of a series comprised of two sets of spring friction circular plates confined between said friction blocks, each spring plate having a gap therein between its free edges, the gaps of one set facing in one direction and alined with said rib of one follower, the gaps of the other set being extended in the opposite direction and alined with the rib of the other follower.

9. In a friction shock absorbing mechanism, the combination with a pair of hollow followers relatively movable toward and from each other and provided with compressing means; of a series of intercalated spring friction plates located within said followers and having a centrally disposed space, said plates being flexed by said compressing means in a manner to decrease the dimensions of said space transverse to the line of relative movement of the followers upon relative approach of the followers; and additional combined spring and friction devices located within said space and adapted to be actuated by said plates upon flexing of the latter during relative approach of the followers.

In witness that I claim the foregoing I have hereunto subscribed my name this 11th day of Feb., 1921.

JOHN F. O'CONNOR.

Witnesses:
CARRIE GAILING,
UNA C. PERIN.